(12) United States Patent
Shinkai et al.

(10) Patent No.: US 10,660,255 B2
(45) Date of Patent: May 26, 2020

(54) TRAVEL CONTROL APPARATUS AND TRAVEL CONTROL METHOD

(71) Applicant: Kubota Corporation, Osaka-shi (JP)

(72) Inventors: Atsushi Shinkai, Sakai (JP); Kazuo Sakaguchi, Amagasaki (JP); Izuru Shimamoto, Amagasaki (JP); Kenji Tamatani, Amagasaki (JP); Megumi Suzukawa, Amagasaki (JP)

(73) Assignee: KUBOTA CORPORATION, Osaka-Shi (JP)

(*) Notice: Subject to any disclaimer, the term of this patent is extended or adjusted under 35 U.S.C. 154(b) by 224 days.

(21) Appl. No.: 15/849,671

(22) Filed: Dec. 21, 2017

(65) Prior Publication Data
US 2018/0206391 A1 Jul. 26, 2018

(30) Foreign Application Priority Data
Jan. 20, 2017 (JP) .................................. 2017-008361

(51) Int. Cl.
| | | |
|---|---|---|
| A01B 69/04 | (2006.01) | |
| B60K 35/00 | (2006.01) | |
| G05D 1/02 | (2020.01) | |

(52) U.S. Cl.
CPC .......... *A01B 69/008* (2013.01); *B60K 35/00* (2013.01); *G05D 1/0212* (2013.01); *G05D 1/0268* (2013.01); *B60K 2370/152* (2019.05); *B60K 2370/171* (2019.05); *B60K 2370/175* (2019.05); *B60K 2370/188* (2019.05); *B60K 2370/61* (2019.05); *B60Y 2200/221* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 9,528,850 B1* | 12/2016 | Hobbs ................. | G05D 1/0255 |
| 2015/0198953 A1 | 7/2015 | Peake et al. | |
| 2016/0146611 A1* | 5/2016 | Matthews ............ | G05D 1/0297 |
| | | | 701/533 |
| 2017/0168501 A1* | 6/2017 | Ogura .................. | G05D 1/0278 |
| 2017/0371334 A1* | 12/2017 | Nagy ................... | B60W 50/14 |
| 2018/0206391 A1* | 7/2018 | Shinkai ............... | A01B 69/008 |

FOREIGN PATENT DOCUMENTS

| | | |
|---|---|---|
| JP | 10-234204 | 9/1998 |
| JP | 2015-195796 | 11/2015 |
| JP | 6564725 B2 | 9/2017 |

OTHER PUBLICATIONS

Extended European Search Report for corresponding EP Application No. 17002005.1-1012, dated May 29, 2018.

* cited by examiner

*Primary Examiner* — Lail A Kleinman
(74) *Attorney, Agent, or Firm* — Mori & Ward, LLP (57) ABSTRACT

A travel control apparatus for a work vehicle includes a display and circuitry. The display is to display a position of the work vehicle. The circuitry is configured to display in the display a guide index via which the work vehicle is manually guided to an automatic-travel permitted area in which the work vehicle is configured to automatically travel, and to determine whether or not the work vehicle is located in the automatic-travel permitted area.

20 Claims, 10 Drawing Sheets

TRAVEL CONTROL APPARATUS AND TRAVEL CONTROL METHOD

CROSS-REFERENCE TO RELATED APPLICATIONS

The present application claims priority under 35 U.S.C. § 119 to Japanese Patent Application No. 2017-008361, filed Jan. 20, 2017. The contents of this application are incorporated herein by reference in their entirety.

BACKGROUND OF THE INVENTION

Field of the Invention

The present invention relates to a travel control apparatus for a work vehicle, and a travel control method for a work vehicle.

Discussion of the Background

As a travel control apparatus described above, an apparatus described in Japanese Patent Application Laid-open No. 2015-195796 has already been known, for example. A travel control apparatus described in Japanese Patent Application Laid-open No. 2015-195796 ("control apparatus" in Japanese Patent Application Laid-open No. 2015-195796) is mounted in a work vehicle ("autonomous traveling-working vehicle" in Japanese Patent Application Laid-open No. 2015-195796). Then, the travel control apparatus controls travel of a work vehicle so that the work vehicle can travel along a set path which is previously laid in a work field.

SUMMARY OF THE INVENTION

According to one aspect of the present invention, a travel control apparatus for a work vehicle includes a display and circuitry. The display is to display a position of the work vehicle. The circuitry is configured to display in the display a guide index via which the work vehicle is manually guided to an automatic-travel permitted area in which the work vehicle is configured to automatically travel, and to determine whether or not the work vehicle is located in the automatic-travel permitted area.

According to another aspect of the present invention, a travel control apparatus for a work vehicle, includes a display, displaying means, and determination means. The display is to display a position of the work vehicle. The displaying means are for displaying in the display a guide index via which the work vehicle is manually guided to an automatic-travel permitted area in which the work vehicle is configured to automatically travel. The determination means are for determining whether or not the work vehicle is located in the automatic-travel permitted area.

According to further aspect of the present invention, a travel control method for a work vehicle includes displaying in a display a guide index via which the work vehicle is manually guided to an automatic-travel permitted area in which the work vehicle is configured to automatically travel, and determining whether or not the work vehicle is located in the automatic-travel permitted area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Embodiments for carrying out the present invention will be described with reference to the drawings. It is noted that unless specific statement is provided, a longitudinal direction in the following description will be referred to as follows. That is, a forward direction of travel of a machine body during work travel is "front", and a backward direction of travel of a machine body during work travel is "rear". Then, a direction corresponding to a right side with respect to a forward-facing orientation in a longitudinal direction is "right", and a direction corresponding to a left side is "left".

Also, in the description regarding FIGS. 3, 4, and 6 to 10, a rightward direction with respect to one who faces a paper sheet is "right", and a leftward direction with respect to one who faces a paper sheet is "left".

Overall Configuration of Tractor

Figure 1:
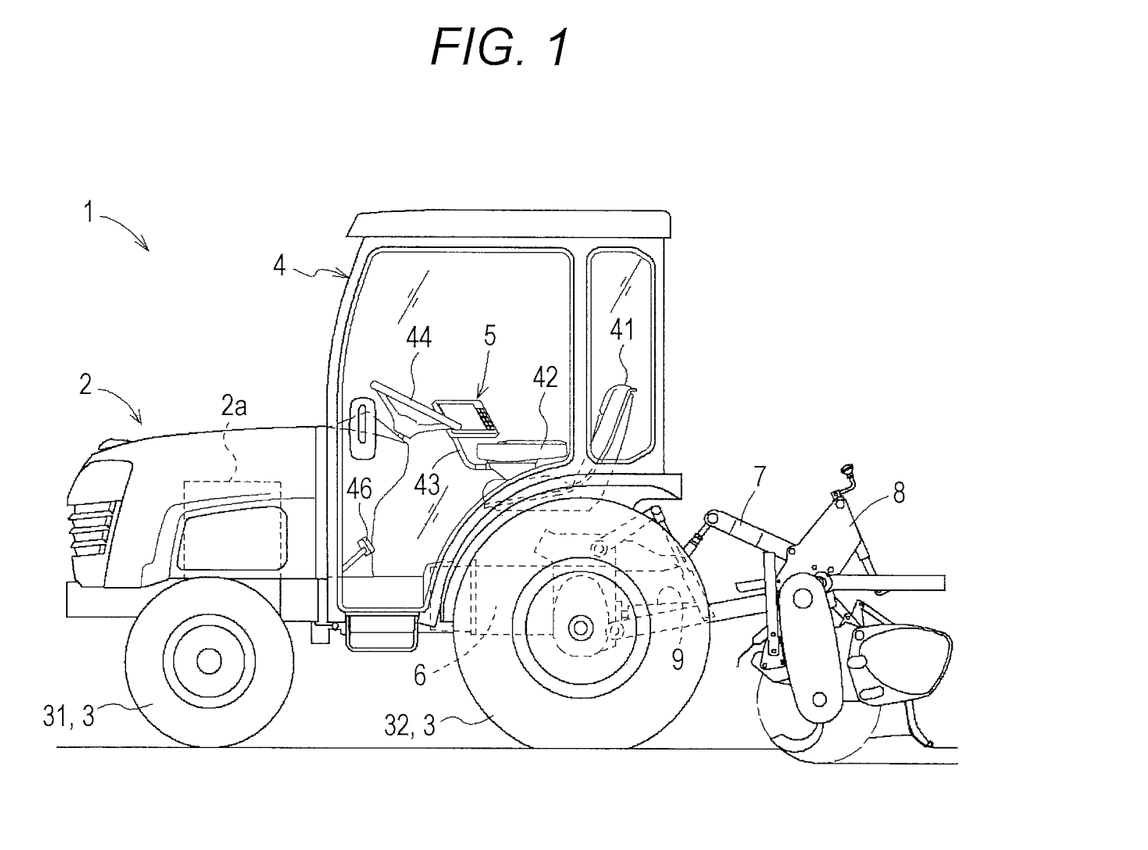
FIG. 1 is a left side view of a tractor.

FIG. 1 is a view showing a configuration of a tractor 1 which is one example of a work vehicle. The tractor 1 is configured to be capable of traveling while working by automatic driving.

As shown in FIG. 1, a prime mover unit 2 is provided in a front portion of a machine body of the tractor 1. The prime mover unit 2 includes an engine 2a. Also, the tractor 1 includes a wheel-type traveling apparatus 3. The traveling apparatus 3 includes a pair of right and left front wheels 31 and a pair of right and left rear wheels 32.

Motive power of the engine 2a is transmitted to the pair of right and left front wheels 31 and the pair of right and left rear wheels 32 via a main clutch (not shown) and a transmission 6. Then, because of the motive power, the pair of right and left front wheels 31 and the pair of right and left rear wheels 32 are driven.

Figure 2:
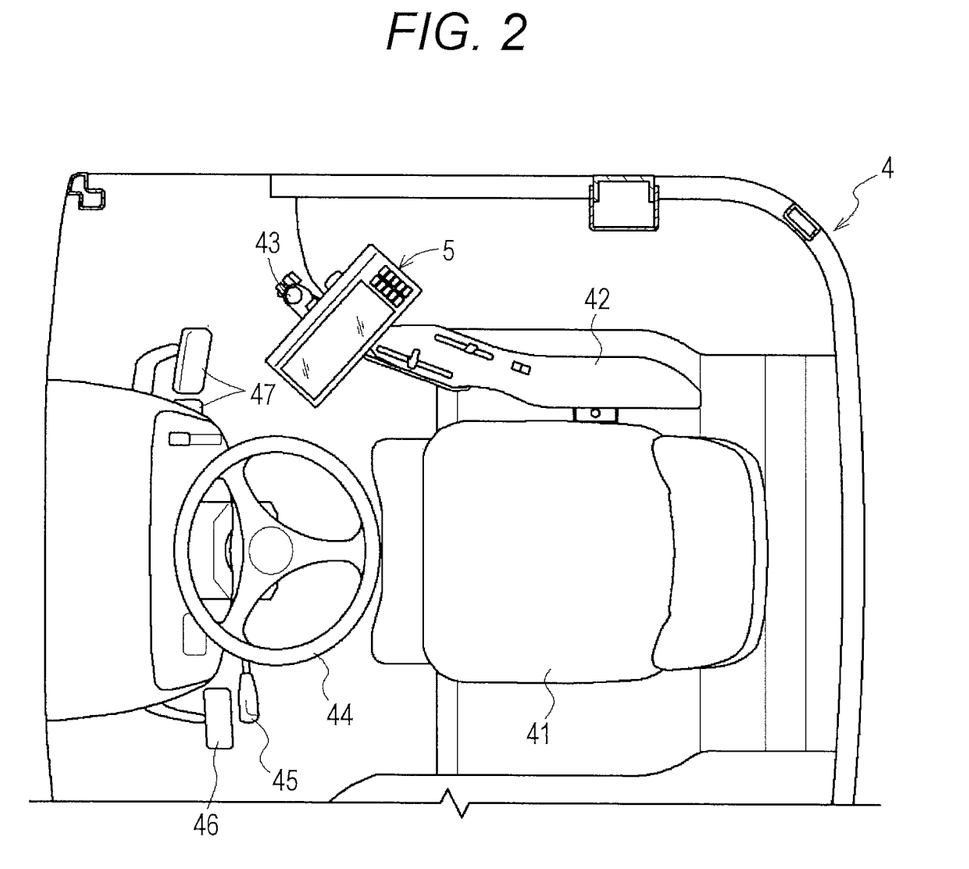
FIG. 2 is a transversely-taken plan view of principal parts, for showing a configuration of a driving unit.

A driving unit 4 is provided in the rear of the prime mover unit 2. As shown in FIGS. 1 and 2, the driving unit 4 includes a driving seat 41, an arm rest 42, a support arm 43, a steering wheel 44, a shuttle lever 45, a clutch pedal 46, right and left brake pedals 47, and a terminal device 5. In the driving unit 4, an operator can manually perform various operations for driving.

As shown in FIGS. 1 and 2, the terminal device 5 is supported by the support arm 43. Also, an operator can perform a steering operation of the pair of right and left front wheels 31 by operating the steering wheel 44.

Also, an operator can switch the tractor 1 between forward movement and backward movement by operating the shuttle lever 45.

Also, an operator can turn on and off the main clutch by operating the clutch pedal 46.

Also, an operator can perform operations of right and left parking brakes by operating the right and left brake pedals 47.

As shown in FIG. 1, a cultivator 8 is mounted in a rear portion of the tractor 1 via a lifting/lowering mechanism 7. Motive power of the engine 2a is transmitted to the cultivator 8 via a PTO shaft 9. Then, because of the motive power, the cultivator 8 is driven.

The tractor 1 can conduct work travel by traveling while driving the cultivator 8.

Configuration of Terminal Device

Figure 3:
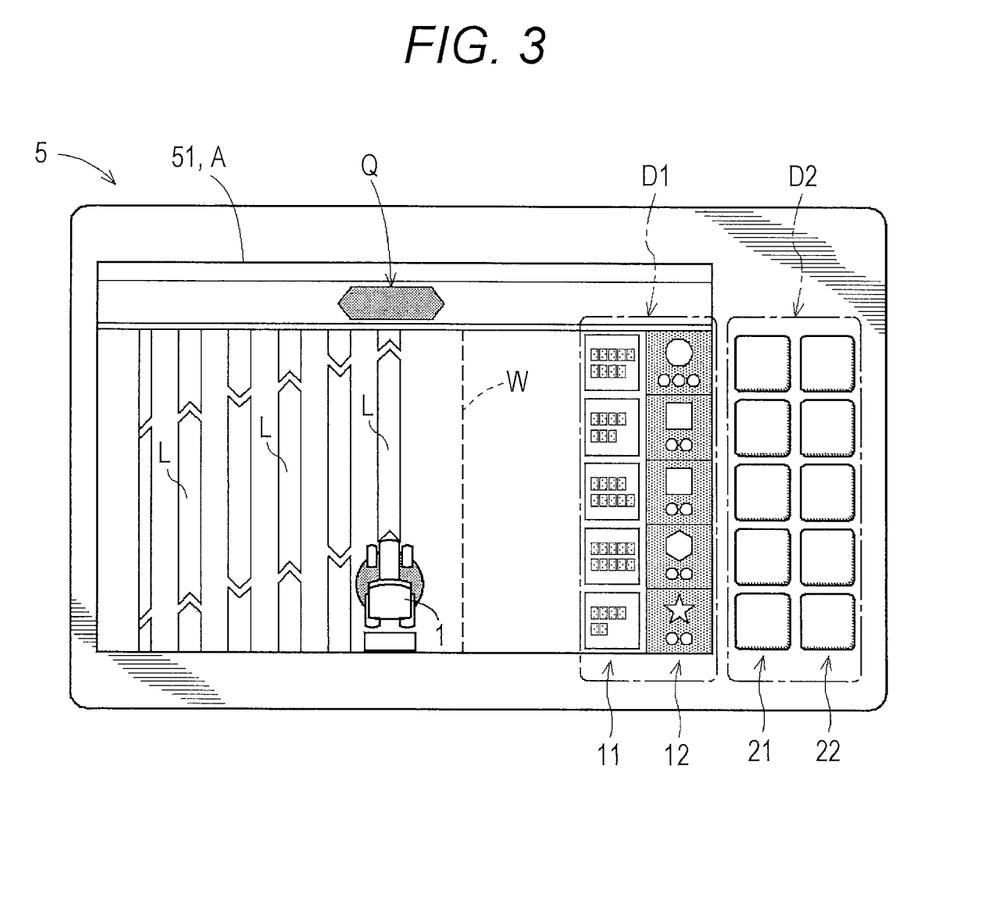
FIG. 3 is a view showing a configuration of a terminal device.
Figure 4:
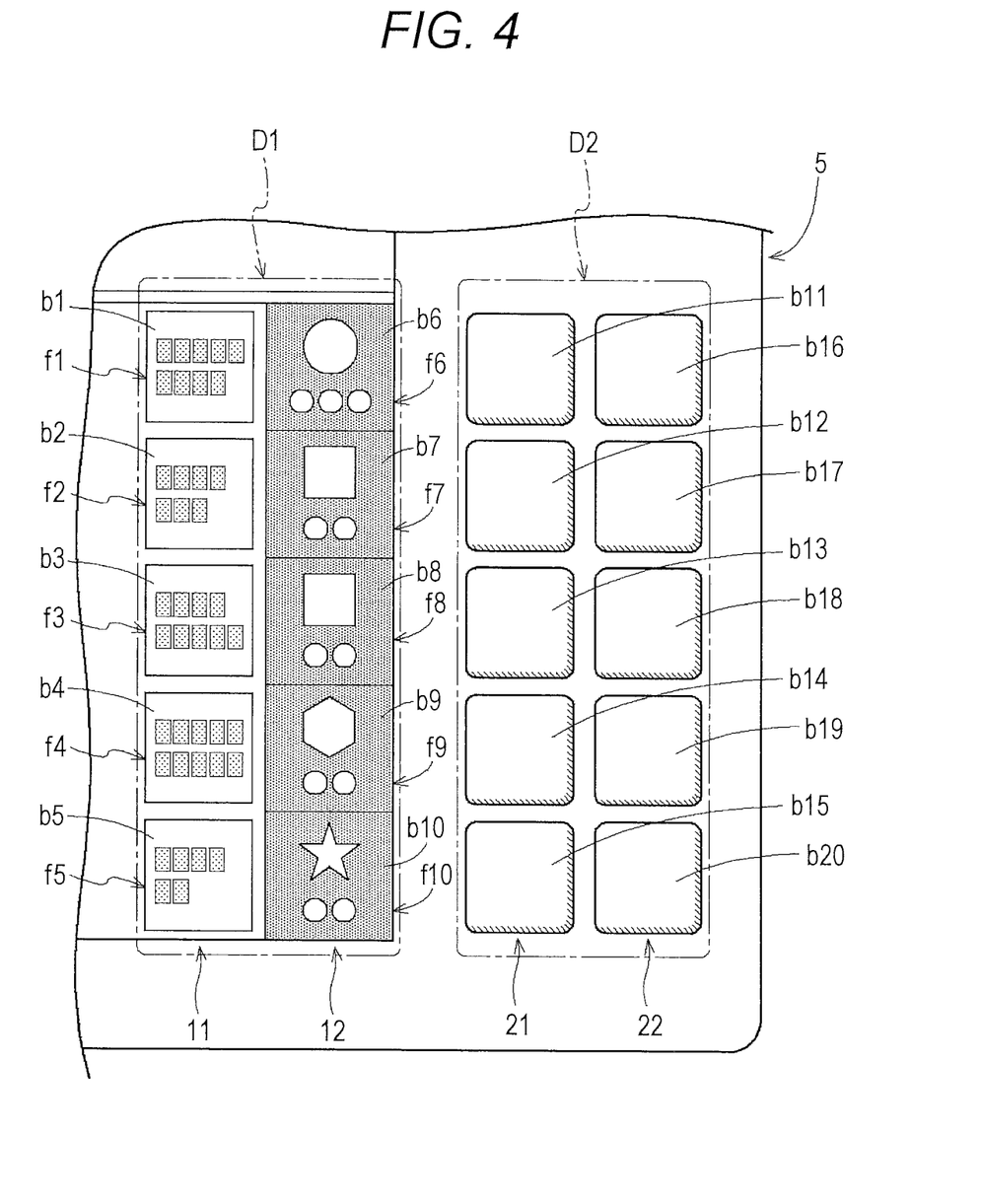
FIG. 4 is an enlarged view of the terminal device, for showing a configuration of a first touch button, a second touch button, a first physical button, and a second physical button.

FIGS. 3 and 4 are views showing the terminal device 5 during work travel by automatic driving. During work travel, five vertically-arranged first touch buttons 11 and five vertically-arranged second touch buttons 12 are displayed in a right end portion of a display 51 included in the terminal device 5. Different functions are assigned to the five first touch buttons 11 and the five second touch buttons 12, respectively.

Also, the display 51 is of a touch-panel type. An operator performs a touch operation on any of the five first touch buttons 11 and the five second touch buttons 12, to thereby cause a function assigned to one of the buttons on which a touch operation is performed, to be fulfilled.

Also, work information which is information about work is displayed on the display 51. In an example shown in FIG. 3, a position of the tractor 1 in a work field W where work travel is to be conducted, and a target travel route L in the work field W are displayed as work information in map form on the display 51.

As shown in FIGS. 3 and 4, the terminal device 5 includes five first physical buttons 21 and five second physical buttons 22 which are provided outside the display 51. The five first physical buttons 21, as well as the five second physical buttons 22, are provided so as to be vertically arranged.

Different functions are assigned to the five first physical buttons 21 and the five second physical buttons 22, respectively. An operator presses any of the five first physical buttons 21 and the five second physical buttons 22, to thereby cause a function assigned to one of the buttons which is pressed, to be fulfilled.

As shown in FIGS. 3 and 4, the five first touch buttons 11 include a first button b1, a second button b2, a third button b3, a fourth button b4, and a fifth button b5. Also, the five second touch buttons 12 include a sixth button b6, a seventh button b7, an eighth button b8, a ninth button b9, and a tenth button b10.

Also, as shown in FIGS. 3 and 4, the five first physical buttons 21 include an eleventh button b11, a twelfth button b12, a thirteenth button b13, a fourteenth button b14, and a fifteenth button b15. Also, the five second physical buttons 22 include a sixteenth button b16, a seventeenth button b17, an eighteenth button b18, a nineteenth button b19, and a twentieth button b20.

As shown in FIGS. 3 and 4, arrangement of the five first touch buttons 11 corresponds to arrangement of the five first physical buttons 21. Also, arrangement of the five second touch buttons 12 corresponds to arrangement of the five second physical buttons 22.

Also, as shown in FIGS. 3 and 4, the five second touch buttons 12 are displayed adjacently to the five first touch buttons 11. Further, the five second physical buttons 22 are provided adjacently to the five first physical buttons 21. Then, a touch-button display area D1 which is an area where the five first touch buttons 11 and the five second touch buttons 12 are displayed, and a physical-button placement area D2 which is an area where the five first physical buttons 21 and the five second physical buttons 22 are placed, are adjacent to each other.

The same functions as assigned to the five first touch buttons 11 are assigned to the five first physical buttons 21, respectively. Also, the same functions as assigned to the five second touch buttons 12 are assigned to the five second physical buttons 22, respectively.

More specifically, the same function is assigned to the first button b1 and the eleventh button b11. Also, the same function is assigned to the second button b2 and the twelfth button b12. Then, likewise, the same functions are assigned to the third button b3 and the thirteenth button b13, the fourth button b4 and the fourteenth button b14, the fifth button b5 and the fifteenth button b15, the sixth button b6 and the sixteenth button b16, the seventh button b7 and the seventeenth button b17, the eighth button b8 and the eighteenth button b18, the ninth button b9 and the nineteenth button b19, and the tenth button b10 and the twentieth button b20, respectively.

In other words, to each of the five first physical buttons 21, the same function as assigned to one of the five first touch buttons 11 which positionally corresponds thereto, is assigned. Also, to each of the five second physical buttons 22, the same function as assigned to one of the five second touch buttons 12 which positionally corresponds thereto, is assigned.

Also, as shown in FIGS. 3 and 4, the first to fifth buttons b1 to b5 have first to fifth function display portions f1 to f5, respectively. Also, the sixth to tenth buttons b6 to b10 have sixth to tenth function display portions f6 to f10, respectively.

The first to tenth function display portions f1 to f10 display respective functions assigned to the first to tenth buttons b1 to b10, respectively.

Also, as described above, respective functions of the first to tenth buttons b1 to b10 correspond to functions of the eleventh to twentieth buttons b11 to b20, respectively. Accordingly, the first to tenth function display portions f1 to f10 also display respective functions assigned to the eleventh to twentieth buttons b11 to b20, respectively.

Control Device

Figure 5:
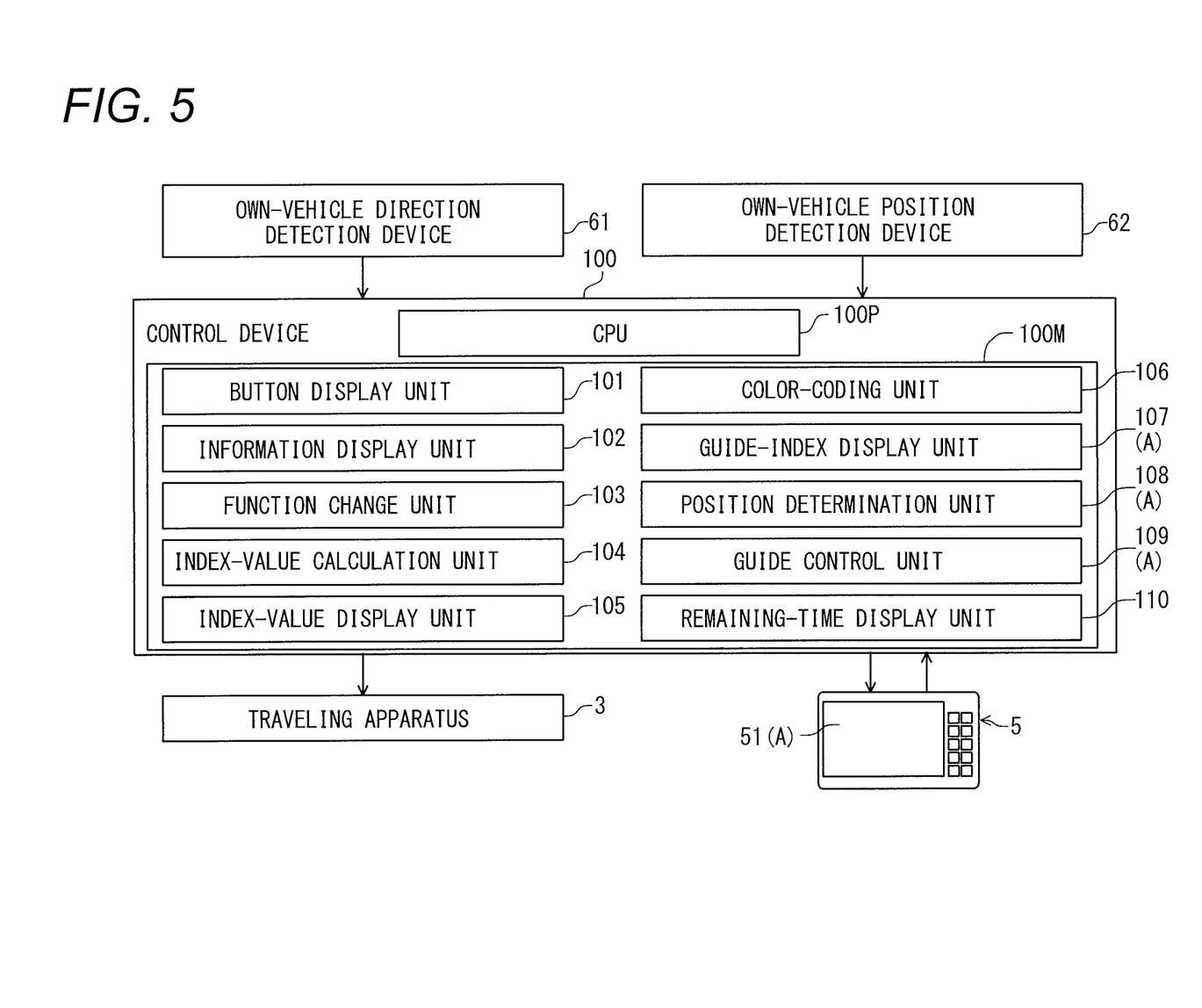
FIG. 5 is an internal structure of the travel control apparatus.

FIG. 5 shows an own-vehicle direction detection device (a travel direction sensor) 61, an own-vehicle position detection device (a vehicle position sensor) 62, and a control device 100. All of the own-vehicle direction detection device 61, the own-vehicle position detection device 62, and the control device 100 are provided in the tractor 1.

The own-vehicle direction detection device 61 detects a direction of travel of an own vehicle. Also, the own-vehicle position detection device 62 detects a position of an own vehicle.

As shown in FIG. 5, the control device 100 receives various signals from the own-vehicle direction detection device 61, the own-vehicle position detection device 62, and the terminal device 5. Then, the control device 100 outputs a predetermined signal to the traveling apparatus 3 and the terminal device 5, based on various signals as input.

Also, as shown in FIG. 5, the control device 100 includes a button display unit 101, an information display unit 102, a function change unit 103, an index-value calculation unit 104, an index-value display unit 105, a color-coding unit 106, a guide-index display unit 107, a position determination unit 108, a guide control unit 109, and a remaining-time display unit 110. The control device 100 includes a CPU (circuitry) 100P and a memory 100M. Programs of the button display unit 101, the information display unit 102, the function change unit 103, the index-value calculation unit 104, the index-value display unit 105, the color-coding unit 106, the guide-index display unit 107, the position determination unit 108, the guide control unit 109, and the remaining-time display unit 110 are stored in the memory 100M and executed by the CPU 100P to perform functions thereof, respectively.

Also, as shown in FIGS. 3 and 5, the tractor 1 includes a travel control apparatus A which controls travel of the tractor 1. The travel control apparatus A includes the display 51, the guide-index display unit 107, the position determination unit 108, and the guide control unit 109.

The button display unit 101 is configured to cause the five first touch buttons 11 to be displayed so as to be vertically arranged on the display 51. Also, the button display unit 101 is configured to cause the five second touch buttons 12 to be displayed so as to be vertically arranged and be adjacent to the five first touch buttons 11 to the right of the five first touch buttons 11, on the display 51.

The information display unit 102 is configured to cause work information to be displayed on the display 51. For example, in FIG. 3, the information display unit 102 causes a position of the tractor 1 in the work field W where work travel is to be conducted, and the target travel route L in the work field W, to be displayed as work information on the display 51.

Below, operations of respective units of the control device 100 will be described, following procedures of work travel of the tractor 1 which is performed by automatic driving.
Movement to Starting Position of Work Travel First, referring to FIGS. 6 and 7, movement of the tractor 1 to a starting position S of work travel will be described.

In conducting work in the work field W with the use of the tractor 1, an operator actuates the terminal device 5 at the outset. Subsequently, an operator provides inputs for various settings with the terminal device 5. At that time, an operator provides inputs for settings of a lap width of cultivation, the number of revolutions of the engine 2a, and the like, for example.

Figure 6:
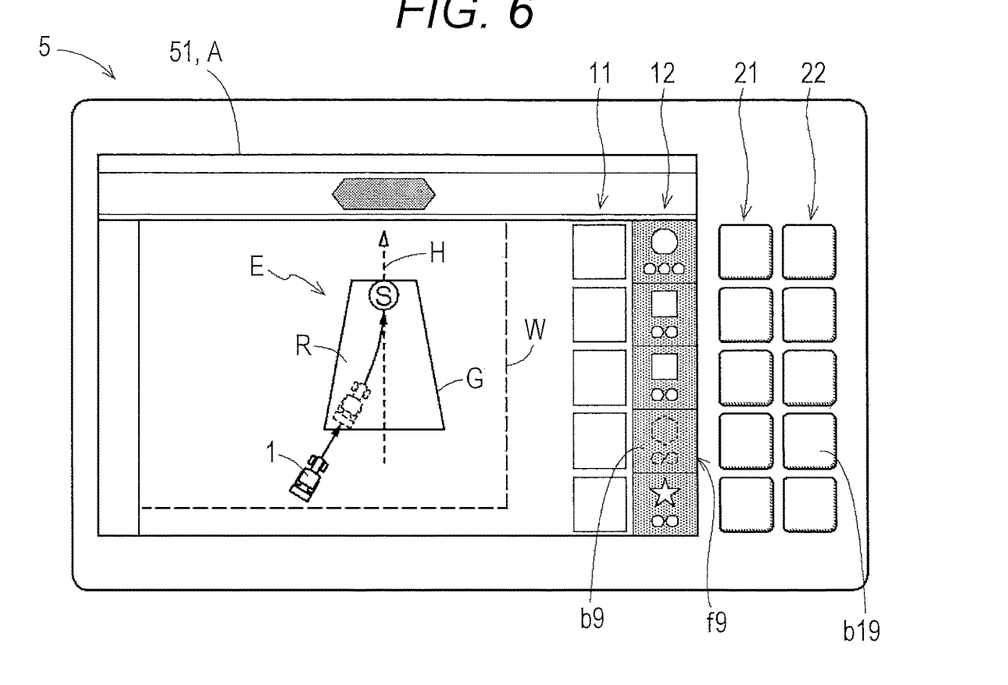
FIG. 6 is a view showing what is displayed on the display during movement to a starting position of work travel.

After inputting for various settings is completed, a current position of the tractor 1 and a guide index E are displayed on the display 51 as shown in FIG. 6. The guide index E is displayed on the display 51 by the guide-index display unit 107. Also, the guide index E corresponds to a guide start area R which is an area defined in the work field W (an example of an "automatic-travel permitted area" of the present invention).

The guide index E includes a figure G and a direction indication symbol H. The figure G represents a position and a shape of the guide start area R. Also, the direction indication symbol H indicates a direction of travel of the tractor 1 at a starting time of work travel. A position where the direction indication symbol H is displayed on the display 51 corresponds to a position of the guide start area R in the work field W.

As shown in FIG. 6, in the present embodiment, the guide start area R has a trapezoidal shape. Because of this, also the figure G displayed on the display 51 has a trapezoidal shape. Also, in the present embodiment, the guide start area R has a shape which is tapered toward a forward direction of travel of the tractor 1 at a starting time of work travel.

The position determination unit 108 shown in FIG. 5 is configured to determine whether or not the tractor 1 is located in the guide start area R, based on a signal provided from the own-vehicle position detection device 62. Also, transition from a manual-travel mode to an automatic-travel mode is allowed when the position determination unit 108 determines that the tractor 1 is located in the guide start area R. In the present embodiment, automatic travel in an automatic-travel mode includes guide to a starting position, by which the tractor 1 is caused to automatically travel to the starting position (target position) S where work travel is started, prior to work travel in which work is actually conducted. Thus, the guide control unit 109 is configured to control the traveling apparatus 3 so that the tractor 1 travels to the starting position S of work travel when the position determination unit 108 determines that the tractor 1 is located in the guide start area R.

It is noted that for determination of whether or not the tractor 1 is located in the guide start area R, either whether or not a whole of the tractor 1 is located in the guide start area R or whether or not a part of the tractor 1 is located in the guide start area R, may be determined.

Also, the guide-index display unit 107 shown in FIG. 5 can switch a display state of the guide index E between a first display state and a second display state. When the position determination unit 108 determines that the tractor 1 is not located in the guide start area R, a display state of the guide index E is a first display state. Also, when the position determination unit 108 determines that the tractor 1 is located in the guide start area R, a display state of the guide index E is a second display state.

In the present embodiment, an inside of the figure G in the first display state is displayed in orange. Also, an inside of the figure G in the second display state is displayed in green. That is, a color of the guide index E in the first display state and a color of the guide index E in the second display state are different from each other.

Thus, an operator can grasp whether or not the tractor 1 is located in the guide start area R.

In a case where the tractor 1 is located in a position where the tractor 1 is shown by a solid line in FIG. 6, the position determination unit 108 determines that the tractor 1 is not located in the guide start area R. Accordingly, at that time, the guide control unit 109 does not control the traveling apparatus 3. Also, at that time, an inside of the figure G is displayed in orange by the guide-index display unit 107.

Then, when an operator manually drives the tractor 1 and the tractor 1 arrives at a position where the tractor 1 is shown by a broken line in FIG. 6, the position determination unit 108 determines that the tractor 1 is located in the guide start area R. As a result of this, the guide control unit 109 starts controlling the traveling apparatus 3. Also, at that time, the guide-index display unit 107 changes a color of an inside of the figure G from orange to green.

It is noted that at that time, the tractor 1 may be configured to move to the position where the tractor 1 is shown by the broken line in FIG. 6 not manually, but by automatic driving.

Then, under the control of the guide control unit 109 over the traveling apparatus 3, the tractor 1 automatically travels from the position where the tractor 1 is shown by the broken line in FIG. 6 to the starting position S. As a result of this, movement of the tractor 1 to the starting position S is completed.

Figure 7:
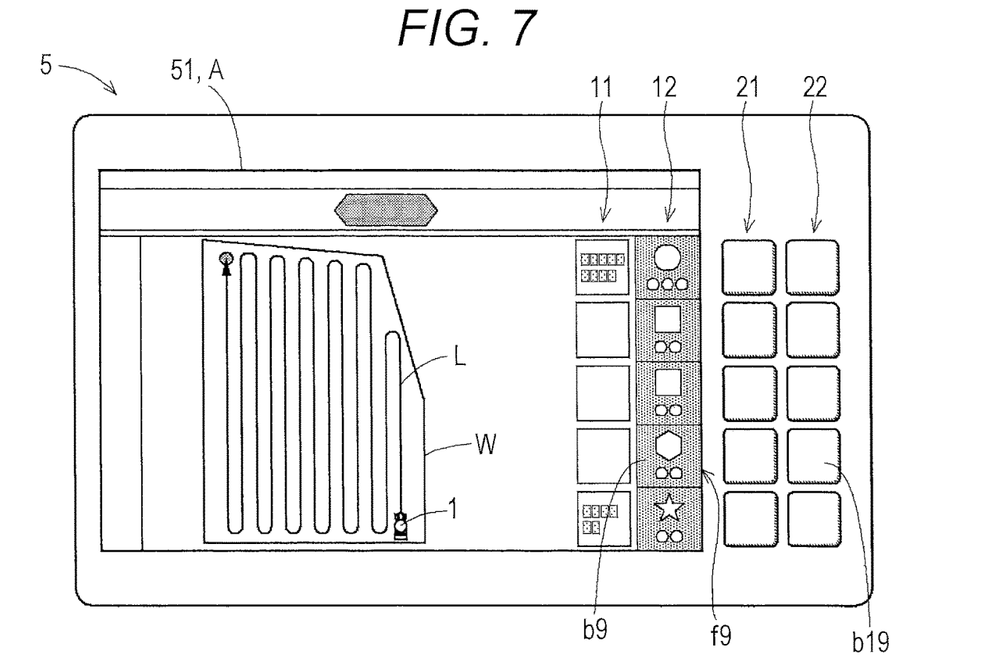
FIG. 7 is a view showing what is displayed on the display at a starting time of work travel.

When movement of the tractor 1 to the starting position S is completed, a whole of the target travel route L in the work field W is displayed on the display 51, as shown in FIG. 7. Meanwhile, the tractor 1 is located in the starting position S in FIG. 7.

Also, in a state shown in FIG. 6, characters "next" are displayed faintly at the ninth function display portion f9 of the ninth button b9 in the present embodiment. On the other hand, in a state shown in FIG. 7, characters. "next" are displayed thickly at the ninth function display portion f9 of the ninth button b9.

In a state shown in FIG. 6, both of operations of the ninth button b9 and the nineteenth button b19 are invalid. Also, in a state shown in FIG. 7, both of operations of the ninth button b9 and the nineteenth button b19 are valid.

In this manner, the button display unit 101 can switch a display state of the second touch button 12 between a first display state and a second display state. Then, in a case where a display state of the second touch button 12 is the first display state, both of operations of the second touch button 12 and the second physical button 22 are valid.

Also, in a case where a display state of the second touch button 12 is the second display state, both of operations of the second touch button 12 and the second physical button 22 are invalid.

More specifically, in a case where a display state of a certain second touch button 12 out of the five second touch buttons 12 is the first display state, characters or symbols are displayed thickly at the certain second touch button 12. At that time, both of operations of the certain second touch button 12 and one of the second physical buttons 22 which corresponds to the certain second touch button 12 are valid.

Also, in a case where a display state of a certain second touch button 12 out of the five second touch buttons 12 is the second display state, characters or symbols are displayed faintly at the certain second touch button 12. At that time, operations of the certain second touch button 12 and one of the second physical buttons 22 which corresponds to the certain second touch button 12 are invalid.

Function of Each Button During Work Travel

Next, referring to FIGS. 3, 4, and 8 to 10, functions of the first to twentieth buttons b1 to b20 which are to be fulfilled while the tractor 1 is traveling while working, will be described.

After movement of the tractor 1 to the starting position (target position) S is completed, upon an operator's press of a driving start button (not shown; inputting an instruction to start automatically traveling) included in the tractor 1, work travel by automatic driving is started. FIGS. 3, 4, and 8 to 10 show the terminal device 5 during work travel of the tractor 1.

Figure 8:
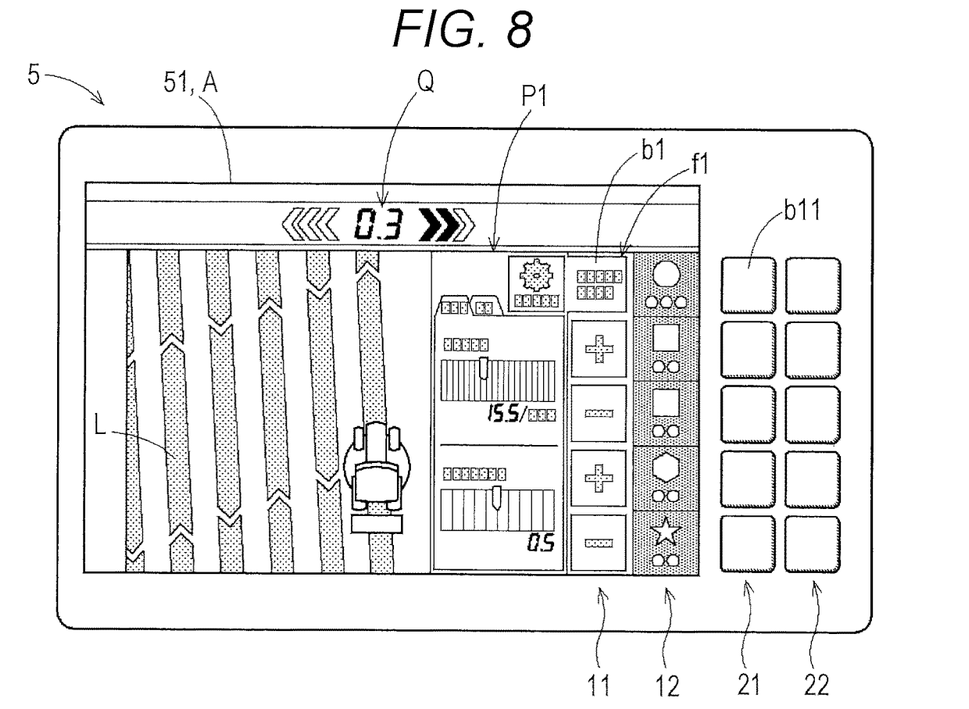
FIG. 8 is a view showing what is displayed on the display during work travel.

While the tractor 1 is traveling while working, characters "change of setting" are displayed at the first function display portion f1 of the first button b1 in the present embodiment, though FIGS. 3, 4, and 8 provide schematic illustration. In a state shown in FIG. 3, when an operator operates the first button b1 or the eleventh button b11, a setting change window P1 is displayed as shown in FIG. 8.

In the setting change window P1, a current vehicle speed and a depth of plowing of the tractor 1 are displayed. It is noted that each of a vehicle speed and a depth of plowing is one kind of the above-described work information.

Also, while the tractor 1 is traveling while working, characters "display of state" are displayed at the second function display portion f2 of the second button b2 in the present embodiment, though FIGS. 3 and 4 provide schematic illustration. Also, characters "recording of work" are displayed at the third function display portion f3 of the third button b3. Also, characters "display of track" are displayed at the fourth function display portion f4 of the fourth button b4. Also, characters "clearing of track" are displayed at the fifth function display portion f5 of the fifth button f5.

When the setting change window P1 is displayed, what is displayed at the second function display portion 12 of the second button b2 shown in FIGS. 3 and 4 is changed from characters "display of state" to a symbol "+" as shown in FIG. 8. Also, at the same time, what is displayed at the third function display portion f3 is changed from "recording of work" to "−", what is displayed at the fourth function display portion f4 is changed from "display of track" to "+", and what is displayed at the fifth function display portion f5 is changed from "clearing of track" to "−".

Also, at that time, respective functions assigned to the five first touch buttons 11 and the five first physical buttons 21 are changed.

As shown in FIG. 3, while the setting change window P1 is not displayed, a function of the first button hl and the eleventh button b11 is to open the setting change window P1. Also, a function of the second button b2 and the twelfth button b12 is to display a state of a vehicle, such as an oil temperature of the transmission 6. Also, a function of the third button b3 and the thirteenth button b13 is to open a work situation window P2 shown in FIG. 9. Also, a function of the fourth button b4 and the fourteenth button b14 is to display a travel track of the tractor 1. Also, a function of the fifth button b5 and the fifteenth button b15 is to clear a recorded travel track of the tractor 1.

On the other hand, as shown in FIG. 8, while the setting change window P1 is displayed, a function of the first button b1 and the eleventh button b11 is to close the setting change window P1. Also, a function of the second button b2 and the twelfth button b12 is to increase a set vehicle speed of the tractor 1. Also, a function of the third button b3 and the thirteenth button b13 is to reduce a set vehicle speed of the tractor 1. Also, a function of the fourth button b4 and the fourteenth button b14 is to increase a depth of plowing of the tractor 1. Also, a function of the fifth button b5 and the fifteenth button b15 is to reduce a depth of plowing of the tractor 1.

That is, when the setting change window P1 is displayed, functions assigned to the five first touch buttons 11 and the five first physical buttons 21 are changed, respectively. Then, such a change in function is carried out by the function change unit 103 in accordance with work information displayed on the display 51.

In this manner, the function change unit 103 is configured to change respective functions assigned to the five first touch buttons 11 and the five first physical buttons 21 in accordance with work information displayed on the display 51.

Also, while the tractor 1 is traveling while working, characters "current location" are displayed at the sixth function display portion f6 of the sixth button b6 out of the five second touch buttons 12 in the present embodiment, though FIGS. 3 and 4 provide schematic illustration. Also, characters "magnification" are displayed at the seventh function display portion f7 of the seventh button b7. Also, characters "reduction" are displayed at the eighth function display portion f8 of the eighth button b8. Also, characters "next" are displayed at the ninth function display portion f9 of the ninth button b9. Also, characters "return" are displayed at the tenth function display portion f10 of the tenth button b10.

Then, as shown in FIG. 8, even when the setting change window P1 is displayed, what is displayed at the sixth function display portion f6, the seventh function display portion V, the eighth function display portion f8, the ninth function display portion f9, and the tenth function display portion f10 of the five second touch buttons 12 is not changed.

Also, respective functions assigned to the five second touch buttons 12 and the five second physical buttons 22 are unchanged irrespective of whether or not the setting change window P1 is displayed.

More specifically, as shown in FIGS. 3, 4, and 8, in both of a case where the setting change window P1 is displayed and a case where the setting change window P1 is not displayed, a function of the sixth button b6 and the sixteenth button b16 is to display a current location of the tractor 1 in the work field W. Also, a function of the seventh button b7 and the seventeenth button b17 is to magnify map display of the work field W on the display 51. Also, a function of the eighth button b8 and the eighteenth button b18 is to reduce map display of the work field W on the display 51. Also, a function of the ninth button b9 and the nineteenth button b19 is to allow message display, display for various settings, or the like on the display 51 to proceed to a next screen. Also, a function of the tenth button b10 and the twentieth button b20 is to return to a preceding screen.

Thus, respective functions assigned to the five second touch buttons 12 and the five second physical buttons 22 are unchanged irrespective of work information displayed on the display 51.

Figure 9:
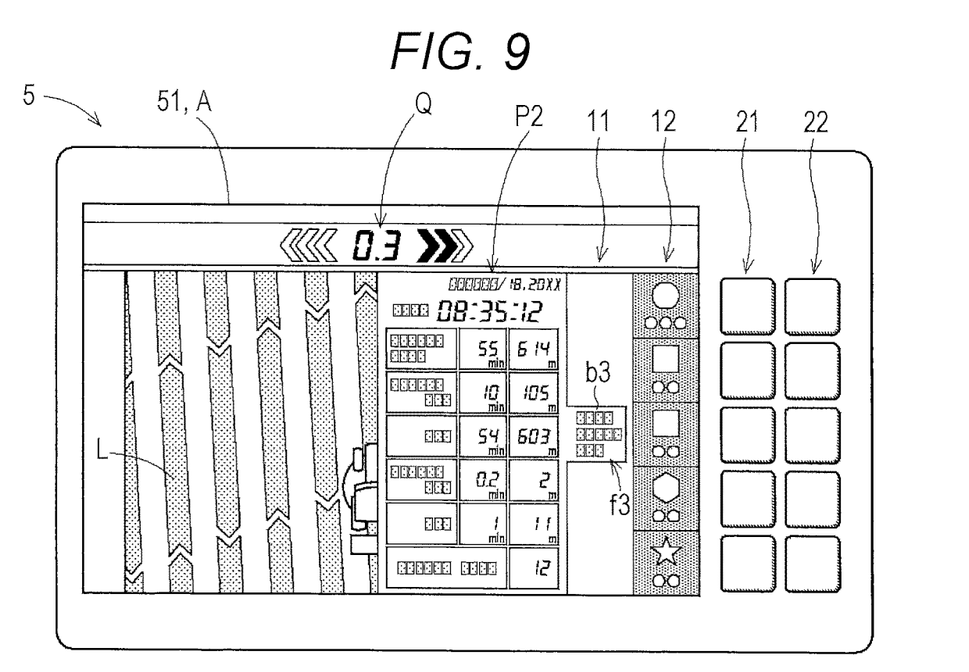
FIG. 9 is a view showing what is displayed on the display during work travel.

Also, in FIG. 8, all of the first touch buttons 11 are displayed on the display 51. On the other hand, as shown in FIG. 9, while the work situation window P2 is displayed, the first button b1, the second button b2, the fourth button b4, and the fifth button b5 out of the five first touch buttons 11 are not displayed on the display 51.

Then, in a state shown in FIG. 8, all of operations of the five first touch buttons 11 are valid. On the other hand, in a state shown in FIG. 9, all of operations of the first button b1, the second button b2, the fourth button b4, and the fifth button b5 out of the five first touch buttons 11 are invalid. Also, in a state shown in FIG. 9, all of operations of the eleventh button b11, the twelfth button b12, the fourteenth button b14, and the fifteenth button b15 are invalid.

Thus, the button display unit 101 can switch a display state of the first touch button 11 between a first display state and a second display state. Then, in a case where a display state of the first touch button 11 is the first display state, both of operations of the first touch button 11 and the first physical button 21 are valid.

Also, in a case where a display state of the first touch button 11 is the second display state, both of operations of the first touch button 11 and the first physical button 21 are invalid.

More specifically, in a case where a display state of a certain first touch button 11 out of the five first touch buttons 11 is the first display state, the certain first touch button 11 is displayed on the display 51. At that time, both operations of the certain first touch button 11 and one of the first physical buttons 21 which corresponds to the certain first touch button 11 are valid.

Also, in a case where a display state of a certain first touch button 11 out of the five first touch buttons 11 is the second display state, the certain first touch button 11 is not displayed on the display 51. At that time, both of operations of the certain first touch button 11 and one of the first physical buttons 21 which corresponds to the certain first touch button 11 are invalid.

Display of Index Value During Work Travel

As shown in FIG. 3 and FIGS. 8 to 10, an index-value display area Q is located in an upper portion of the display 51. In the index-value display area Q, an index value which indicates a degree of deviation of an actual travel track from the target travel route L, is displayed.

In the present embodiment, the foregoing index value is a directional deviation which is a deviation of travel direction of an own vehicle from a direction of the target travel route L. It is noted that the index value is not limited to a directional deviation, and may be a positional deviation of an own vehicle from the target travel route L.

In the present embodiment, a directional deviation represented by an index value is calculated by the index-value calculation unit 104 based on a signal provided from the own-vehicle direction detection device 61. Then, the calculated directional deviation is displayed in the index-value display area Q by the index-value display unit 105. It is noted that what is displayed in the index-value display area Q by the index-value display unit 105 is not limited to a number. The index-value display unit 105 can display also an indicator or the like which indicates a direction of deviation or an amount of directional deviation, in the index-value display area Q.

Also, the index-value display unit 105 is configured to cause a directional deviation to be displayed in any color of green, yellow, and red on the display 51, depending on an amount of a directional deviation. More specifically, a color of a directional deviation which is displayed is green when a directional deviation is relatively small, is yellow when a directional deviation is moderate, and is red when a directional deviation is relatively large.

Figure 10:
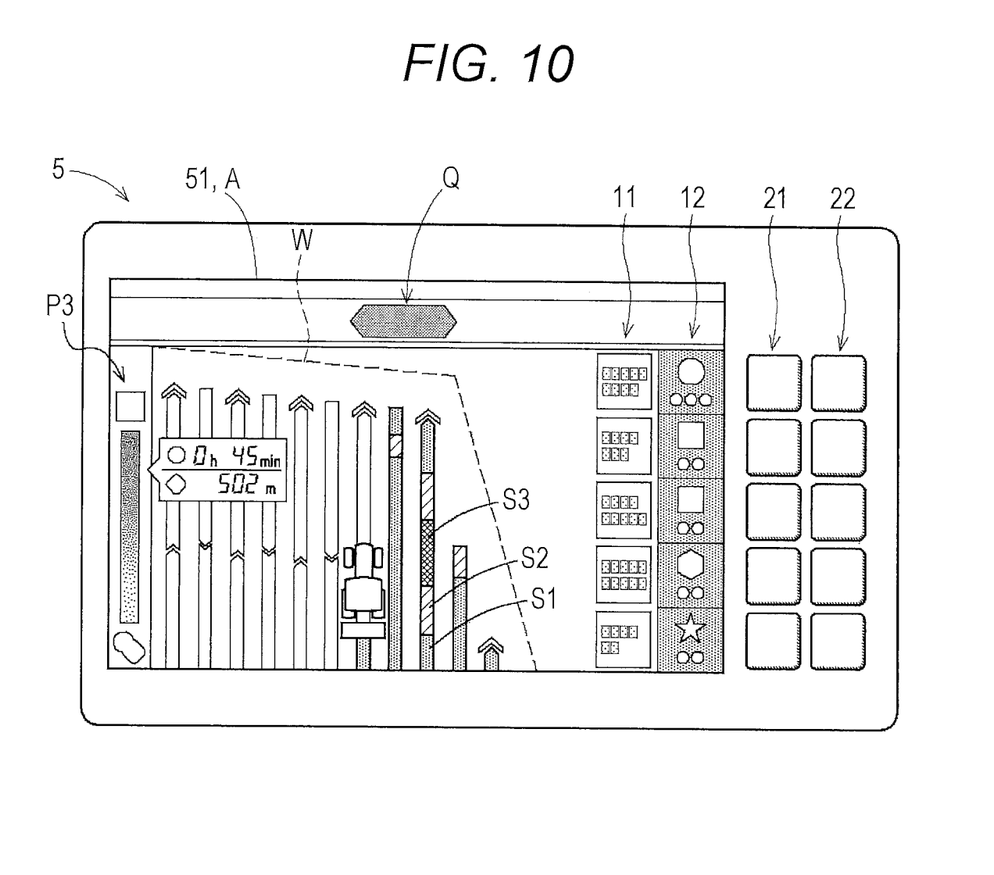
FIG. 10 is a view showing what is displayed on the display during work travel.

As shown in FIGS. 3 and 10, in a case where a directional deviation is relatively small, no number is displayed in the index-value display area Q. At that time, a green indicator in a shape of a hexagon which is horizontally lengthened is displayed in the index-value display area Q by the index-value display unit 105. This indicator informs an operator that a current directional deviation is relatively small. That is, the indicator serves to indicate a directional deviation.

Also, as shown in FIGS. 8 and 9, in a case where a directional deviation is moderate or relatively large, a number indicating a directional deviation is displayed in the index-value display area Q by the index-value display unit 105. Also, at that time, an indicator indicating a direction and an amount of deviation is displayed in a position adjacent to the number indicating a directional deviation, by the index-value display unit 105. In an example shown in FIGS. 8 and 9, the indicator indicates that a travel direction of an own vehicle deviates rightward from a direction of the target travel route L.

Then, such a number and indicator as described above are displayed in yellow when a directional deviation is moderate, and are displayed in red when a directional deviation is relatively large.

The color-coding unit 106 shown in FIG. 5 is configured to color-code a portion which the tractor 1 has traveled in the target travel route L displayed on the display 51, with the use of colors of green, yellow, and red, as shown in FIG. 10.

More specifically, the color-coding unit 106 color-codes a section where a directional deviation is displayed in green in the index-value display area Q, in green, color-codes a section where a directional deviation is displayed in yellow in the index-value display area Q, in yellow, and color-codes a section where a directional deviation is displayed in red in the index-value display area Q, in red.

In the present embodiment, assume that a directional deviation is displayed in green in the index-value display area Q while the tractor 1 is traveling a first section s1 shown in FIG. 10. Also, assume that a directional deviation is displayed in yellow in the index-value display area Q while the tractor 1 is traveling a second section s2 shown in FIG. 10. Also, assume that a directional deviation is displayed in red in the index-value display area Q while the tractor 1 is traveling a third section s3 shown in FIG. 10.

In this case, as shown in FIG. 10, the first section s1 in the target travel route L displayed on the display 51 is color-coded in green. Also, the second section s2 is color-coded in yellow. Also, the third section s3 is color-coded in red.

In this manner, the color-coding unit 106 is configured to color-code a portion where travel is finished in the target travel route L displayed on the display 51, in accordance with an index value.

As shown in FIG. 10, the display 51 can display a remaining-time display window P3. In the remaining-time display window P3, an estimated value of remaining time until the tractor 1 finishes traveling a whole of the target travel route L is displayed.

The estimated value of remaining time is displayed on the display 51 by the remaining-time display unit 110 shown in FIG. 5.

According to the above-described configuration, after the tractor 1 arrives in the guide start area R, movement to the starting position S of work travel is supposed to be automatically made subsequently. In other words, in moving the tractor 1 to the starting position S, an operator just has to operate the tractor 1 so that the tractor 1 arrives in the guide start area R.

Therefore, the above-described configuration could make it easy to stop the tractor 1 exactly in the starting position S.

Figure 11:
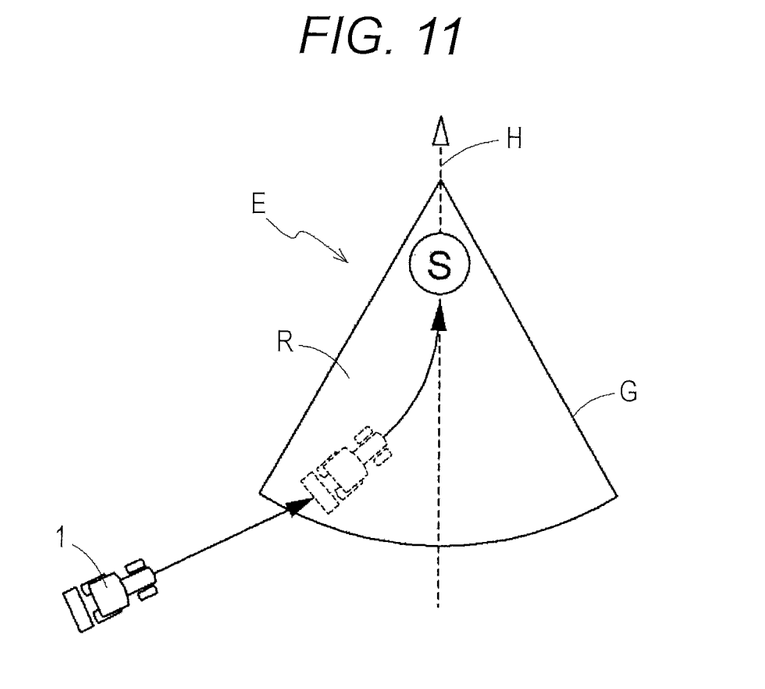
FIG. 11 is a view showing a guide start area in the other embodiments.
Figure 12:
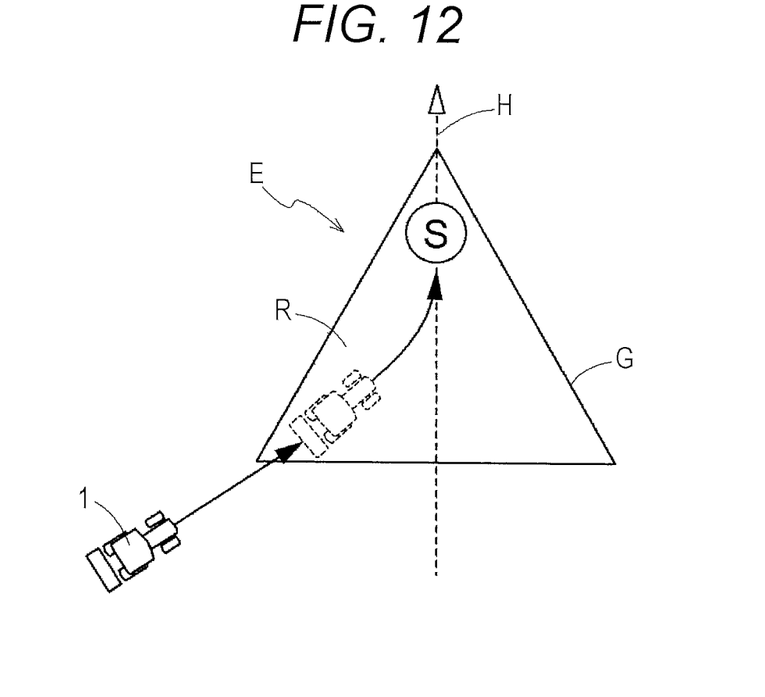
FIG. 12 is a view showing a guide start area in the other embodiments.
Figure 13:
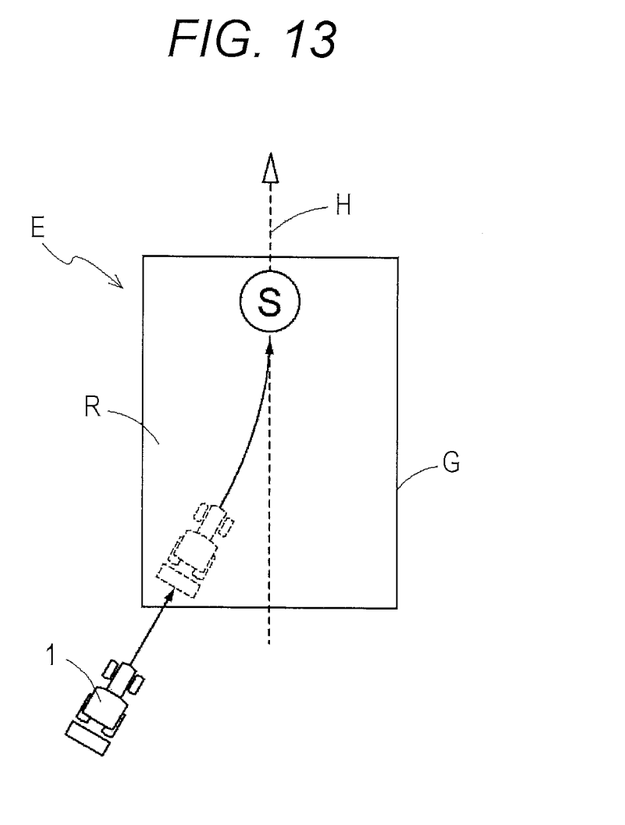
FIG. 13 is a view showing a guide start area in the other embodiments.

Other Embodiments (1) In the above-described embodiment, the guide start area R has a trapezoidal shape as shown in FIG. 6. For this reason, also the figure G displayed on the display 51 has a trapezoidal shape. However, in place of this configuration, there may be provided a configuration in which the guide start area R has a shape of sector and also the figure G displayed on the display 51 has a shape of sector as shown in FIG. 11. Also, there may be provided a configuration in which the guide start area R has a triangular shape and also the figure G displayed on the display 51 has a triangular shape, as shown in FIG. 12. Also, there may be provided a configuration in which the guide start area R has a rectangular shape and also the figure G displayed on the display 51 has a rectangular shape, as shown in FIG. 13.

(2) In the above-described embodiment, the first touch buttons 11, the second touch buttons 12, the first physical buttons 21, and the second physical buttons 22 each include five buttons which are vertically arranged. However, in place of this configuration, a plurality of the first touch buttons 11, a plurality of the second touch buttons 12, a plurality of the first physical buttons, 21, and a plurality of the second physical buttons 22 each many be provided so as to be horizontally arranged. Also, each of the numbers of first touch buttons 11, the second touch buttons 12, the first physical buttons 21, and the second physical buttons 22 may be six or more, and may be four or less. Also, the first touch buttons 11, the second touch buttons 12, the first physical buttons 21, and the second physical buttons 22 may each include one button.

(3) The second touch buttons 12 may be omitted.

(4) The second physical buttons 22 may be omitted.

(5) There may be provided a configuration in which in a case where a display state of a certain second touch button 12 out of the plurality of second touch buttons 12 is the first display state, the certain second touch button 12 is displayed on the display 51, and in a case where the display state is the second display state, the certain second touch button 12 is not displayed on the display 51.

(6) There may be provided a configuration in which in a case where a display state of a certain first touch button 11 out of the plurality of first touch buttons 11 is the first display state, characters or symbols are displayed thickly at the certain first touch button 11, and in a case where the display state is the second display state, characters or symbols are displayed faintly at the certain first touch button 11.

(7) There may be provided a configuration in which each of display states of the plurality of first touch buttons 11 cannot be switched between the first display state and the second display state.

(8) There may be provided a configuration in which each of display states of the plurality of second touch buttons 12 cannot be switched between the first display state and the second display state.

(9) The plurality of first touch buttons 11 and the plurality of second touch buttons 12 are not necessarily required to be adjacent to each other. For example, there may be provided a configuration in which the plurality of first touch buttons 11 are placed in a left end portion of the display 51 and the plurality of the second touch buttons 12 are placed in a right end portion of the display 51.

(10) The touch-button display area D1 and the physical-button placement area D2 are not necessarily required to be adjacent to each other. For example, there may be provided a configuration in which the touch-button display area D1 is placed in a left end portion of the display 51 and the physical-button placement area D2 is placed in a position to the right of the display 51.

(11) The traveling apparatus 3 may be of either a crawler type or a semi-crawler type.

(12) A color of an inside of the figure G in a case where a display state of the guide index E is the first display state may be displayed in other colors than orange.

(13) A color of an inside of the figure G in a case where a display state of the guide index E is the second display state may be displayed in other colors than green.

(14) A color of the guide index E in the first display state and a color of the guide index E in the second display state may be identical to each other. In such a case, there may be provided a configuration in which the guide index E in the first display state is displayed in a blinking state, and the guide index E in the second display state is displayed in a simply-lighted-up state, for example.

(15) There may be provided a configuration in which a display state of the guide index E cannot be switched between the first display state and the second display state.

(16) The guide index E may include only the direction indication symbol H out of the figure G and the direction indication symbol H. In other words, there may be provided a configuration in which only the direction indication symbol H is displayed on the display 51 and the figure G is not displayed.

(17) The guide index E may include only the figure G out of the figure G and the direction indication symbol H. In other words, there may be provided a configuration in which only the figure G is displayed on the display 51 and the direction indication symbol H is not displayed.

(18) Although in the above-described embodiment, description has been made by taking a case where automatic travel in an automatic-travel mode includes guide to a starting position, by which the tractor 1 is caused to automatically travel to the starting position S where work travel is started, prior to work travel in which work is actually conducted, as an example, that example does not impose any limitation. For example, there may be provided a configuration in which the guide index E is provided in the starting position S and transition to an automatic-travel mode takes place, in other words, work travel is started, when the tractor 1 is located in the starting position S (automatic-travel permitted area).

(19) The own-vehicle direction detection device 61 may be omitted.

(20) The own-vehicle position detection device 62 may be omitted.

(21) There may be provided a configuration in which no index value is displayed on the display 51.

(22) A color of an index value displayed on the display 51 may be consistently unchanged irrespective of a magnitude of an index value.

(23) The color-coding unit 106 may be configured so as to color-code the target travel route L independently of a color of an index value displayed on the display 51.

(24) A color of an index value displayed on the display 51 may be any of other colors than green, yellow, and red.

(25) Color-coding performed by the color-coding unit 106 is not limited to a color-coding pattern in the above-described embodiment. For example, there may be provided a configuration in which the target travel route L is color-coded in other combinations of colors than a combination of green, yellow, and red. Also, there may be provided a configuration in which the target travel route L is color-coded in two colors, or a configuration in which the target travel route L is color-coded in four or more colors.

(26) The remaining-time display unit 110 may be omitted.

(27) Although in the above-described embodiment, an example where the display 51 and the control device 100 are provided so as to be fixed to a work vehicle has been described, a configuration is not limited to that example. There may be provided a configuration in which the display 51 and the control device 100 are mounted in a portable terminal machine that an operator can carry. Alternatively, there may be provided a configuration in which the display 51 and the control device 100 are mounted in a ground-based management controller which is installed at a location remote from a work vehicle. Thus, the same functions as described above can be fulfilled in a portable terminal machine or a ground-based management controller.

The features of the present invention lie in that a travel control apparatus to control travel of a work vehicle capable of conducting work travel by automatic driving, the travel control apparatus including: a display capable of displaying a position of the work vehicle in a work field where the work travel is conducted; a guide-index display unit to cause the display to display a guide index corresponding to an automatic-travel permitted area which is an area defined in the work field; and a position determination unit to determine whether or not the work vehicle is located in the automatic-travel permitted area, in which transition to an automatic-travel mode is allowed when the position determination unit determines that the work vehicle is located in the automatic-travel permitted area.

According to an embodiment of the present invention, when a work vehicle arrives in an automatic-travel pet miffed area, transition to an automatic-travel mode is allowed subsequently. That is, in moving a work vehicle to a starting position of automatic travel, an operator just has to operate a work vehicle so that the work vehicle arrives in an automatic-travel permitted area.

Therefore, the embodiment of the present invention makes it easy to start automatic travel from an appropriate position.

Further, it is preferable in the embodiment of the present invention that the guide index includes a figure representing a position and a shape of the automatic-travel permitted area, and the automatic-travel permitted area has a shape which is tapered toward a forward direction of travel of the work vehicle at a starting time of the work travel.

In subjecting a work vehicle to automatic guided travel from a spot located in the rear of a starting position of work travel to the starting position, for example, if the spot is displaced rightward or leftward from the starting position, it is necessary to correct rightward or leftward displacement while subjecting the work vehicle to guided travel to the starting position. At that time, in a case where a width of rightward or leftward displacement is too large, a situation where rightward or leftward displacement cannot be satisfactorily corrected during guided travel is expected to occur.

In this regard, the farther a spot where guided travel starts is located from a starting position in the rear of the starting position, the longer a distance of guided travel becomes, so that an upper limit of a width of rightward or leftward displacement that can be corrected during guided travel becomes high. In other words, the farther a spot where guided travel starts is located from a starting position in the rear of the starting position, the more permissible rightward or leftward displacement from the starting position becomes. Accordingly, an area definable as a starting spot of guided travel becomes horizontally wider toward a rear end.

According to the above-described configuration, an automatic-travel permitted area has a shape which becomes wider toward a rear end of a direction of travel of a work vehicle at a starting time of work travel. Thus, it is possible to define an automatic-travel permitted area, reflecting a fact that the farther a spot in the rear of the starting position is, the more permissible rightward or leftward displacement becomes. That is, it is possible to define a range of an automatic-travel permitted area as widely as possible while ensuring that rightward or leftward displacement is corrected by the time a work vehicle arrives at a starting position of work travel.

Also, in a case where a work vehicle is subjected to automatic guided travel from a spot in the rear of a starting position of work travel to the starting position, for example, if a forward direction of travel of the work vehicle in the spot is deviated from a forward direction of travel of the work vehicle at a starting time of work travel, it is necessary to correct such directional deviation while subjecting the work vehicle to guided travel to a starting position. At that time, in a case where an angle of directional deviation is too great, a situation where the directional deviation cannot be satisfactorily corrected by the time a work vehicle arrives at a starting position is expected to occur.

According to the above-described configuration, an operator can grasp what direction a forward direction of travel of a work vehicle at a starting time of work travel is, by seeing a figure displayed on a display. Thus, an operator can operate a work vehicle so that the above-stated directional deviation is reduced by the time the work vehicle arrives in an automatic-travel permitted area. This makes it easy to avoid a situation where directional deviation cannot be satisfactorily corrected by the time a work vehicle arrives at a starting position.

Further, it is preferable in the embodiment of the present invention that the automatic-travel permitted area has a trapezoidal shape.

According to this configuration, a shape which becomes wider toward a rear end of a direction of travel of a work vehicle can be achieved by such a simple shape as a trapezoidal shape. Accordingly, the above-described effects of "defining a range of an automatic-travel permitted area as widely as possible while ensuring that rightward or leftward displacement is corrected by the time a work vehicle arrives at a starting position of work travel" can be attained, and also, a shape of an automatic-travel permitted area can be simplified.

Further, it is preferable in the embodiment of the present invention that the automatic-travel permitted area has a shape of a sector.

According to this configuration, a shape which becomes wider toward a rear end of a direction of travel of a work vehicle can be achieved by such a simple shape as a shape of a sector. Accordingly, the above-described effects of "defining a range of an automatic-travel permitted area as widely as possible while ensuring that rightward or leftward displacement is corrected by the time a work vehicle arrives at a starting position of work travel" can be attained, and also, a shape of an automatic-travel permitted area can be simplified.

Further, it is preferable in the embodiment of the present invention that the automatic-travel permitted area has a triangular shape.

According to this configuration, a shape which becomes wider toward a rear end of a direction of travel of a work vehicle can be achieved by such a simple shape as a triangular shape. Accordingly, the above-described effects of "defining a range of an automatic-travel permitted area as widely as possible while ensuring that rightward or leftward displacement is corrected by the time a work vehicle arrives at a starting position of work travel" can be attained, and also, a shape of an automatic-travel permitted area can be simplified.

Further, it is preferable in the embodiment of the present invention that the guide index includes a figure representing a position and a shape of the automatic-travel permitted area, and the automatic-travel permitted area has a rectangular shape.

According to this configuration, a shape of an automatic-travel permitted area can be simplified.

Further, it is preferable in the embodiment of the present invention that the guide index includes a direction indication symbol indicating a direction of travel of the work vehicle at a starting time of the work travel, and a position where the direction indication symbol is displayed on the display corresponds to a position of the automatic-travel permitted area in the work field.

According to this configuration, an operator can grasp what direction a forward direction of travel of a work vehicle at a starting time of work travel is, by seeing a direction indication symbol displayed on a display. Thus, an operator can operate a work vehicle so that the above-stated directional deviation is reduced by the time the work vehicle arrives in an automatic-travel permitted area. This makes it easy to avoid a situation where directional deviation cannot be satisfactorily corrected by the time a work vehicle arrives at a starting position.

Further, it is preferable in the embodiment of the present invention that the guide-index display unit is capable of switching a display state of the guide index between a first display state and a second display state, the display state of the guide index is the first display state when the position determination unit determines that the work vehicle is not located in the automatic-travel permitted area, and the display state of the guide index is the second display state when the position determination unit determines that the work vehicle is located in the automatic-travel permitted area.

According to this configuration, an operator can easily confirm whether or not a work vehicle arrives in an automatic-travel permitted area by seeing a display state of a guide index.

Further, it is preferable in the embodiment of the present invention that a color of the guide index in the first display state and a color of the guide index in the second display state are different from each other.

According to this configuration, an operator can easily confirm that a work vehicle arrives in an automatic-travel permitted area through a change in a color of a guide index.

INDUSTRIAL APPLICABILITY

The embodiment of the present invention is applicable to a head-feeding combine-harvester, a normal-type combine-harvester, a corn harvester, a rice transplanting machine, and the like, in addition to a tractor.

Obviously, numerous modifications and variations of the present invention are possible in light of the above teachings. It is therefore to be understood that within the scope of the appended claims, the invention may be practiced otherwise than as specifically described herein.

What is claimed is:

1. A travel control apparatus for a work vehicle, comprising:
   a display to display a position of the work vehicle; and
   circuitry configured to
      display in the display a work field and a guide index within the work field via which the work vehicle is manually guided to an automatic-travel permitted area in which the work vehicle is configured to automatically travel, and
      determine whether or not the work vehicle is located in the automatic-travel permitted area,
   wherein the guide index includes a figure representing a position and a shape of a guide start area that defines the automatic-travel permitted area, the guide start area including a starting position at which work travel of the work vehicle starts.

2. The travel control apparatus according to claim 1, wherein the work vehicle is enabled to automatically travel when the work vehicle is determined to be located in the automatic-travel permitted area.

3. The travel control apparatus according to claim 1, wherein the automatic-travel permitted area has a shape which is tapered toward a forward direction of the travel of the work vehicle when the work vehicle starts automatically traveling.

4. The travel control apparatus according to claim 3, wherein the automatic-travel permitted area has a trapezoidal shape.

5. The travel control apparatus according to claim 3, wherein the automatic-travel permitted area has a shape of a sector.

6. The travel control apparatus according to claim 3, wherein the automatic-travel permitted area has a triangular shape.

7. The travel control apparatus according to claim 1, wherein the automatic-travel permitted area has a rectangular shape.

8. The travel control apparatus according to claim 1, wherein the guide index includes a direction indication symbol indicating a direction of the automatic travel of the work vehicle when the work vehicle starts automatic traveling for the work travel, and
wherein a position where the direction indication symbol is displayed on the display corresponds to the starting position.

9. The travel control apparatus according to claim 1, wherein the guide index is displayable in a first display state and a second display state,
wherein the guide index is displayed in the first display state when the circuitry determines that the work vehicle is not located in the automatic-travel permitted area, and
wherein the guide index is displayed in the second display state when the circuitry determines that the work vehicle is located in the automatic-travel permitted area.

10. The travel control apparatus according to claim 9, wherein a color of the guide index in the first display state and a color of the guide index in the second display state are different from each other.

11. The travel control apparatus according to claim 1, further comprising:
a vehicle position sensor to detect a position of the work vehicle; and
a travel direction sensor to detect a travel direction of the work vehicle.

12. A travel control apparatus for a work vehicle, comprising:
a display to display a position of the work vehicle;
displaying means for displaying in the display a work field and a guide index within the work field via which the work vehicle is manually guided to an automatic-travel permitted area in which the work vehicle is configured to automatically travel; and
determination means for determining whether or not the work vehicle is located in the automatic-travel permitted area,
wherein the guide index includes a figure representing a position and a shape of a guide start area that defines the automatic-travel permitted area, the guide start area including a starting position at which work travel of the work vehicle starts.

13. A travel control method for a work vehicle, comprising:
displaying in a display a work field and a guide index within the work field via which the work vehicle is manually guided to an automatic-travel permitted area in which the work vehicle is configured to automatically travel; and
determining whether or not the work vehicle is located in the automatic-travel permitted area,
wherein the guide index includes a figure representing a position and a shape of a guide start area that defines the automatic-travel permitted area, the guide start area including a starting position at which work travel of the work vehicle starts.

14. The travel control apparatus according to claim 2, wherein the work vehicle is automatically traveled to the starting position after the work vehicle is determined to be located in the automatic-travel permitted area.

15. The travel control apparatus according to claim 2, wherein the work vehicle starts automatically traveling for the work travel when an instruction to start automatically traveling is inputted in a condition where the work vehicle is located at the starting position.

16. The travel control apparatus according to claim 15, wherein the instruction is inputted by pushing a button in the work vehicle.

17. The travel control apparatus according to claim 12, wherein the work vehicle is enabled to automatically travel when the work vehicle is determined to be located in the automatic-travel permitted area.

18. The travel control apparatus according to claim 17, wherein the work vehicle is automatically traveled to the starting position after the work vehicle is determined to be located in the automatic-travel permitted area.

19. The travel control apparatus according to claim 18, wherein the work vehicle starts automatically traveling for the work travel when an instruction to start automatically traveling is inputted in a condition where the work vehicle is located at the starting position.

20. The travel control apparatus according to claim 19, wherein the instruction is inputted by pushing a button in the work vehicle.

* * * * *